Figure 1:
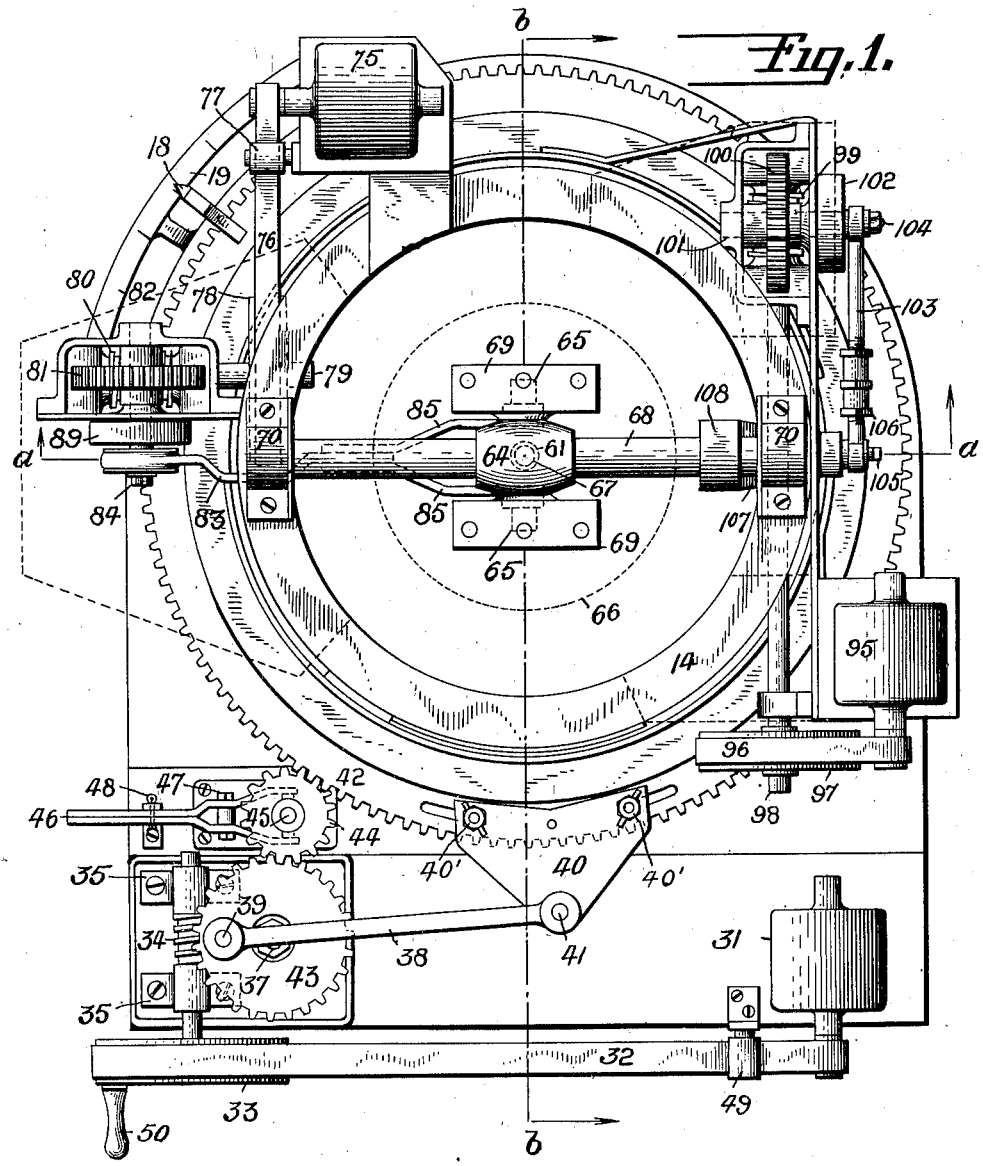

Nov. 3, 1925.

E. A. SPERRY 1,560,435

APPARATUS FOR TESTING GYROSCOPIC COMPASSES

Filed Sept. 19, 1919   5 Sheets-Sheet 1

INVENTOR
ELMER A. SPERRY.
BY
Herbert H. Thompson
his ATTORNEY

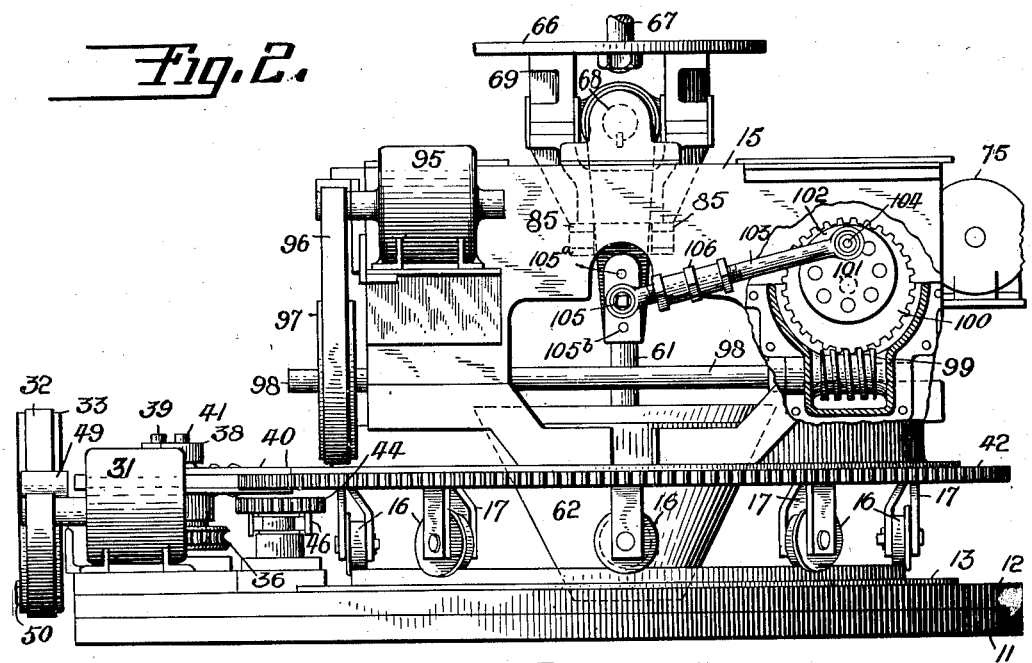

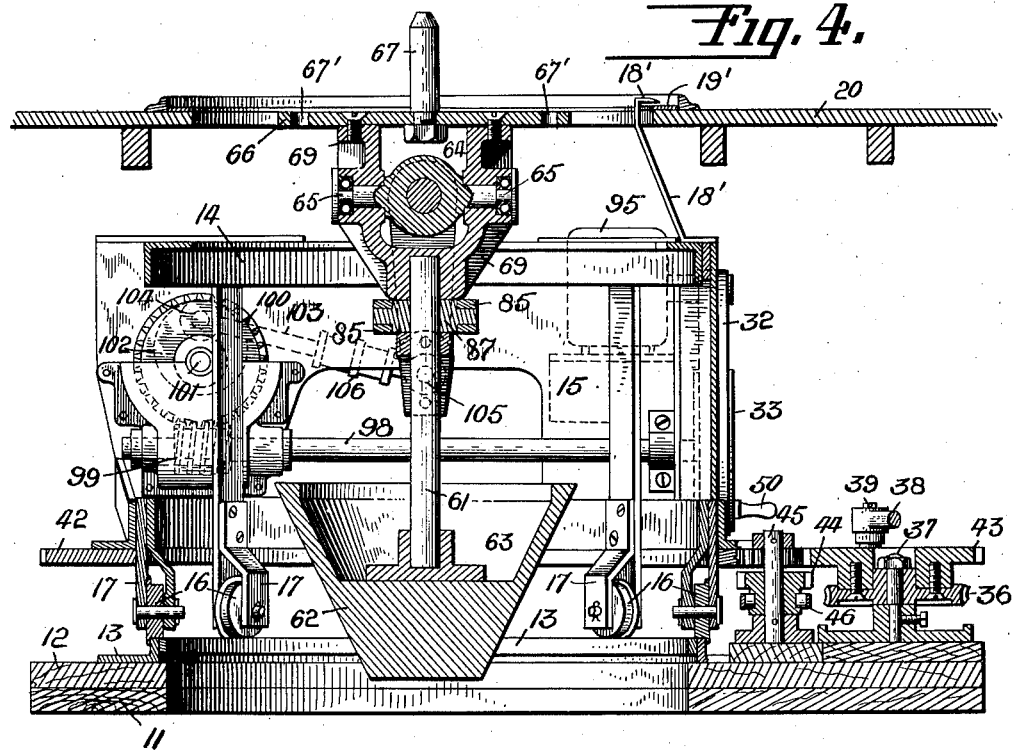

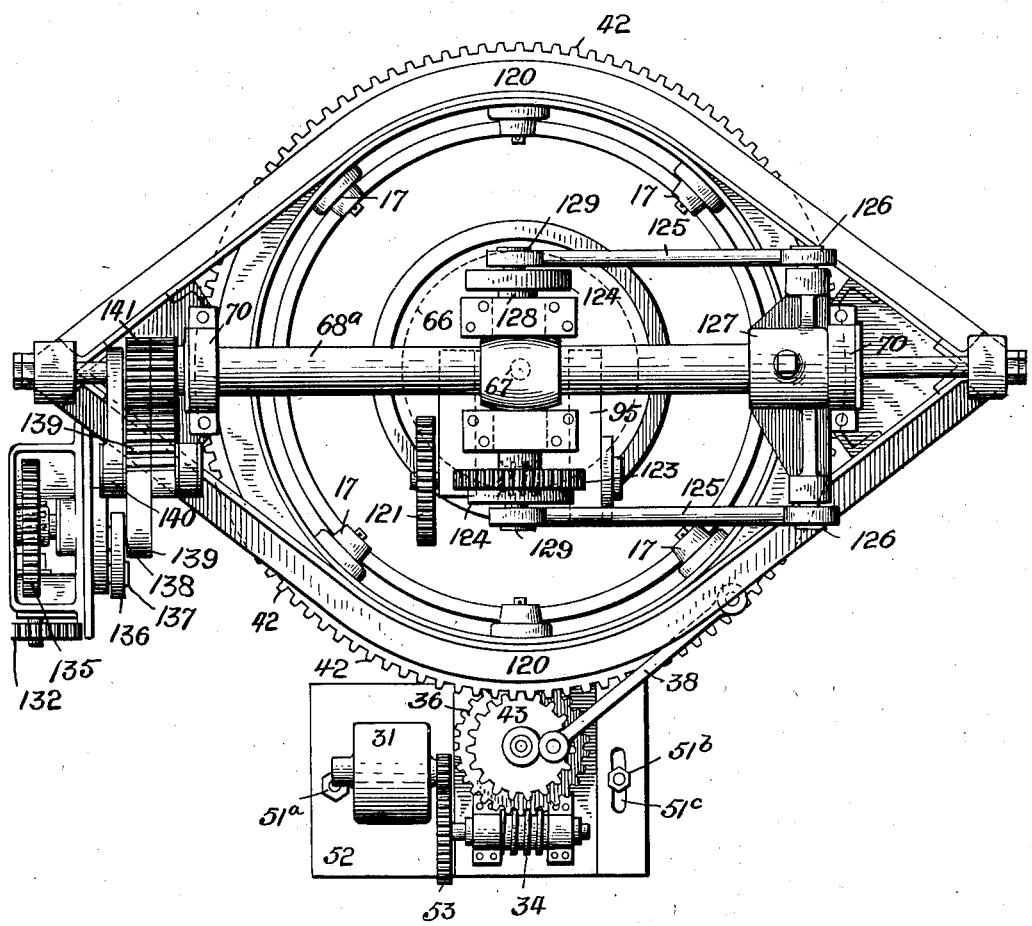

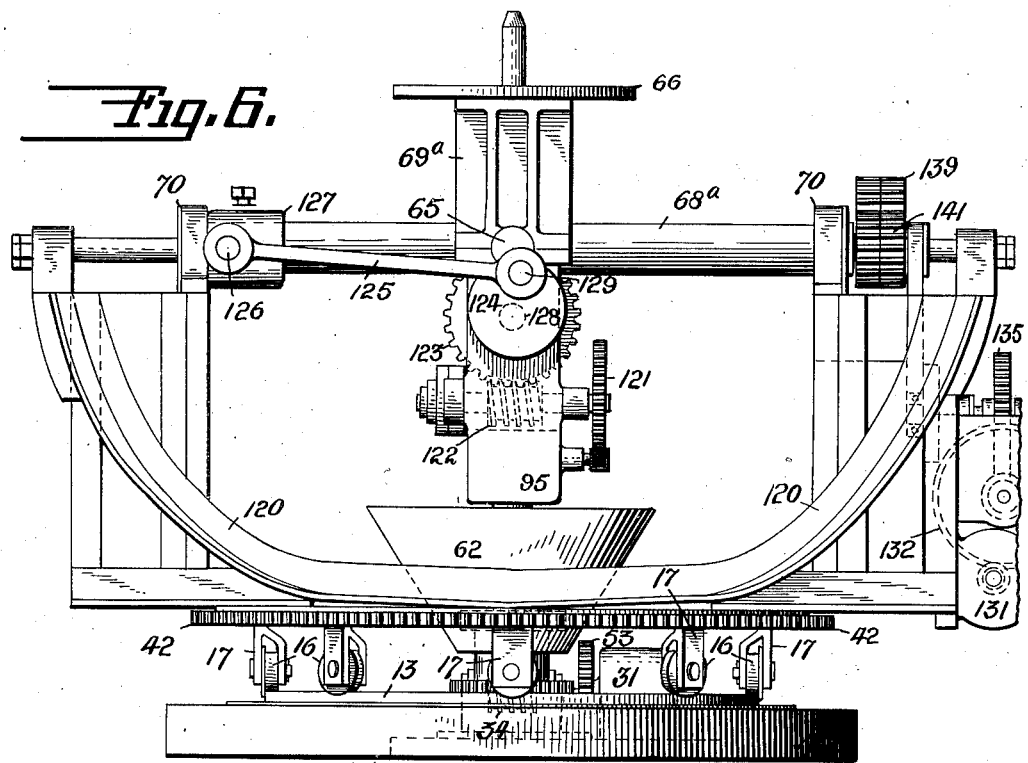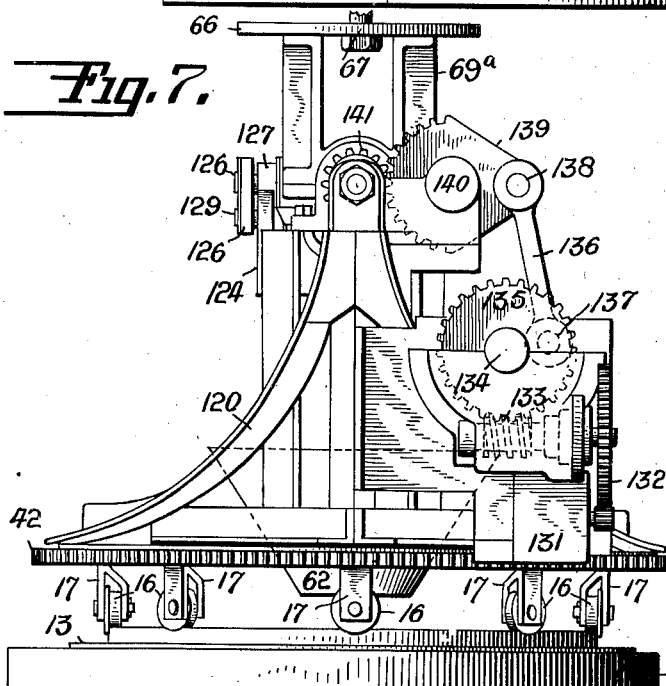

Patented Nov. 3, 1925.

1,560,435

UNITED STATES PATENT OFFICE.

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

APPARATUS FOR TESTING GYROSCOPIC COMPASSES.

Application filed September 19, 1919. Serial No. 324,747.

*To all whom it may concern:*

Be it known that I, ELMER A. SPERRY, a citizen of the United States of America, residing at 1505 Albermarle Road, Brooklyn, New York, in the county of Kings and State of New York, have invented certain new and useful Improvements in Apparatus for Testing Gyroscopic Compasses, of which the following is a specification.

This invention relates to a scorsby which is a term used to designate a mechanism designed to impart a variety of motions to a testing stand. One object of this invention is to produce a variety of pre-determined simultaneous motions centered in a particular part; another object is to produce said motions independently of each other and which may be independently controlled and varied.

Other objects will appear from the construction and arrangement of the apparatus as described in the following specifications and illustrated in the accompanying drawings, in which, Figure 1, is a plan view looking down on the scorsby with parts in dotted lines to show operating mechanisms beneath the same, Figure 2 is a side elevation with part of the covering removed to show the mechanism. Figure 3 is a sectional view on line $a$—$a$ of Figure 1 and Figure 4 is a sectional view on line $b$—$b$ Figure 1. Figures 5, 6, 7 show modifications of the apparatus in which the imparted movements operate through a larger angle; Figure 5 being a plan view, Figure 6 is a side elevation and Figure 7 is an end elevation of this modification.

One use to which this invention may be applied is to produce, artificially, conditions corresponding to the various motions of a ship on the ocean, for the purpose of testing marine instruments such as gyroscopic compasses. These motions include, rolling; pitching and yawing in any and all directions or planes and are centered in the testing stand of the instrument.

Referring to the drawings, 11 and 12 represent foundation rings to which the flanged base ring 13 is secured. On this ring the flanged rollers 16, pivoted in the arms 17, move and carry the superstructure 15; thus providing a carriage suitable for rotating the entire mechanism in a horizontal plane. An index pointer 18 is secured to the moving carriage and indicates on the scale 19, which is secured to the foundation ring 12 by suitable means, both located below the operating platform 20 so that when the mechanism to be described, is operated to set the machine to make a certain movement of a predetermined number of degrees, the same may be observed from beneath the platform. Conveniently located near the platform 20 is another pointer 18' and a scale 19' which may be provided with a moulding about the outer edges so as to not only protect the scale and pointer but also the testing engineer. This latter scale and pointer shows the engineer at a glance, when making his report, that the machine was yawing the proper number of degrees without having to go beneath the platform.

This horizontal rotation is obtained from motor 31, Figure 1, which, by belt connection 32, drives wheel 33, and this in turn, drives the worm 34, in the bearings 35. This worm engages worm wheel 36, Figure 4, pivoted at 37 and to which the spur gear 43 is secured. The pitman 38 is secured at 39 to this gear and the other end is secured at 41 to plate 40, which is, in turn, bolted to the carriage of the mechanism. Thus, oscillating or yawing motion is imparted to the carriage moving on the rollers 16 due to the eccentricity of the pivot 39 in wheel 43.

When it is desired to change the yaw to a greater or less degree, or if it should be desirable to impart a continuous motion to the carriage, the pitman 38 is disconnected and the spur gear 44, pivoted at 45, is brought into mesh with gear 43, and with the circumferential gear 42 of the mechanism, by means of the clutch lever 46, pivoted at 47, and latched in position by cotter pin 48. An idler 49 is provided as a belt tightener for the belt 32 and the handle 50 is provided on wheel 33, for convenience, when it is desired to make a change in the yawing motion of the machine. This is done by loosening the wing nuts 40' and removing the plate 40 from the gear 42. In this particular instance slots 40$^a$ are shown in the gear element 42 for the bolts to pass through. After turning the handle 50 the plate 40 and bolts 40' may be replaced, thus a variation in the movement or yaw is given to the compass carried thereby.

In the center of the mechanism, the vertical shaft 61, supported by the casting 69, is pivoted to the sleeve 64, by the trunnions 65. Sleeve 64 is secured to horizontal shaft 68, which is supported in bearings 70 on the top ring 14 of the mechanism. The stand, 66 is secured to the casting 69 and the instrument to be tested is secured to this stand by pin 67 and by use of bolts (not shown) through the holes 67'. The various motions of the mechanism therefore center about this stand. The lower end of shaft 61 is provided with a hollow conical weight 62 to balance the weight of the instrument on stand 66. A pocket 63 is provided in this weight so that the balance may be varied by adding weights to the pocket.

Testing stand 66 is swung transversely on the axis 65 as shown in Figure 3 by the motor 75 Figure 1 so as to impart the roll to the scorsby. For this purpose the motor is connected to driving wheel 78 by the belt 76 and idler 77. On the shaft 79 of wheel 78, the worm 80 is secured and arranged to engage the worm wheel 81; secured to shaft 82. On the end of this shaft a disc 89 is provided having a series of holes drilled eccentric to the shaft as shown in Figure 3. In one of these holes the pivot of the pitman 83 is secured. The other end of this pitman is forked at 85 and engages the sleeve 87 to which it is pivoted at 88. In order to permit lateral motion of the pitman 83, a ball and socket joint is provided at 84 and the sleeve 87 fits loosely on shaft 61 being held in position by the collar 90; this permits a free rolling motion being imparted to the shaft 61 at right angles to that imparted by pitman 83. The motor 75 thus imparts an oscillating motion to the vertical shaft 61 and a corresponding rocking motion to the testing stand 66. The degree of oscillation of 61 may be varied by changing the pivot pin 84, to holes nearer or further from the center of disc 89. In order to provide for an equal swing about the vertical axis of shaft 61, slot 86 is provided in the pitman so that its length may be adjusted by changing the position of the forks 85.

Another motion is imparted to table 66 at right angles to that just described by the partial rotation of the horizontal shaft 68. This pitching motion originates with motor 95 driving shaft 98 through wheel 97 and belt 96. Shaft 98 drives the worm 99 engaging with worm wheel 100 mounted on shaft 101. A disc 102 is secured to the end of this shaft: to this disc the pitman 103 is pivoted at 104. The other end of this pitman is pivoted at 105 to the crank arm 107 and the hub 108 of this crank is secured to horizontal shaft 68 thus providing for a partial rotation, back and forth, of this shaft.

The disc 102 is provided with a series of holes eccentric to the shaft 101 similar to disc 89 and thus providing adjustment for the motion of pitman 103 according to the hole occupied by the pivot 104. The extent of the rotation of shaft 68 can also be varied by the position of pivot 105 in the crank arm 107, holes 105ª and 105ᵇ at different distances from the axis of rotation being provided for this purpose. A turn buckle 106 is provided on the pitman 103 so that its length may be adjusted to obtain an equal swing about the vertical axis of shaft 61.

From the foregoing description it will be observed, that stand 66 is subject to three distinct motions any or all of which may be brought into action as desired. For instance, the motion originating with motor 75 will rock the stand transversely as shown in Figure 3, this may be considered the equivalent of the rolling motion of a ship, the motion originating with motor 95 rocking the stand at right angles to this motion, is then the equivalent of the pitching motion of a ship and the partial horizontal rotation obtained from motor 31 is the equivalent of the "yawing" of a ship, that is, the motion caused by the operation of the ship's steering mechanism. Any motor may be stopped or started or its speed varied without interfering with the operation of the rest of the mechanism. The result of a change in the speed of any motor will obviously be to vary the period of oscillation of the instrument supporting member about the corresponding axis.

The large angle scorsby shown in Figs. 5, 6 and 7 is designed to produce a larger swing of the testing stand and differs somewhat in detail construction from the type just described. The motor 31 is connected by the gear 53 to the worm 34. The driving mechanism is mounted on the base 52 which is pivoted by bolt 51ª and locked in position by bolt 51ᵇ in slot 51ᶜ. This permits gear 43 to be brought into mesh with gear 42 when continuous rotation is desired and to be disengaged when the pitman 38 is brought into use for oscillating motion.

The motor 95 Fig. 6 is suspended in the center of the carriage above the conical weight 62 and moves with it. This motor is directly geared by spur gear 121, worm 122 and worm wheel 123 to shaft 128 upon which the crank discs 124 are mounted and to these discs the connecting rods 125 are pivoted at 129. The other end of these rods is secured at 126 to the casting 127 which is fixed to the shaft 68ª. This imparts a transverse motion to testing stand 66, from the motor 95, while the entire mechanism rotates with shaft 68ª.

The oscillatory rotation of shaft 68ª is caused by the motor 131 which is connected thereto by spur gear 132, worm 133, worm wheel 135 pivoted at 134, connecting rod 136 pivoted at 137 to wheel 135 and at 138 to the quadrant 139 which is pivoted at 140. This quadrant is provided with teeth to engage the spur gear 141 on the shaft 68ª thereby actuating this shaft in response to the reciprocating movement of connecting rod 136. The gear ratio between quadrant 139 and spur gear 141 is 2 to 1; this causes shaft 68ª to swing through twice the angle of the quadrant to represent an extreme rolling movement from the horizontal.

To permit this wide swing and to make the mechanism more accessible the angle iron frame 120 is depressed in the center to the circumferential gear and curved upward at the ends to support the bearings of shaft 68ª. The casting 69ª supporting testing stand 66, it will be noted, extends higher above shaft 68ª than casting 69, Figure 4, extends above shaft 68, thus increasing the radius of movement on shaft 68ª.

Considering the operation of this mechanism, it will be seen that when the carriage, alone, is moved, the testing stand, located on its vertical axis merely revolves with the carriage. If this stand is deflected from the vertical axis it will move in the arc of a circle when the carriage is moved. If the rocking motion and carriage motion occur at the same time the stand will move in an irregular curve instead of in the arc of a circle. If simultaneous rocking motion is applied at right angles while the carriage is rotated, the stand will move in an irregular curve which will be the resultant of the applied movements.

Having thus described my invention I claim:—

1. In a testing stand for gyroscopic compasses, a carriage mounted for turning about a vertical axis, a testing stand supported by said carriage, means for imparting an independent oscillatory motion to said stand in planes at right angles to each other, and means for simultaneously oscillating said carriage about said vertical axis.

2. In a testing stand for gyroscopic compasses, a carriage mounted for turning about a vertical axis, a testing stand supported by said carriage, means for simultaneously imparting an independent oscillatory motion to said stand in two planes, and means for oscillating said carriage about said vertical axis.

3. In a testing stand for gyroscopic instruments, a carriage mounted for turning about a vertical axis, a testing stand supported by said carriage, a balance weight suspended below the point of support of said stand and rigidly secured thereto, means for rocking said stand in planes at right angles to each other, and means for turning said carriage about said axis.

4. In a testing stand for gyroscopic instruments, a carriage mounted for turning about a vertical axis, a horizontal shaft rotatably supported by said carriage, a testing stand pivotally secured to said shaft and free to swing relatively thereto, means for imparting oscillatory motion to said stand on said pivot, means for oscillating said shaft about its axis, and means for imparting oscillatory motion to said carriage about said vertical axis.

5. In a testing stand for gyroscopic instruments, a carriage mounted for turning about a vertical axis, a horizontal shaft supported by said carriage, a testing stand pivotally secured to said shaft and free to swing relatively thereto, a mechanism for imparting oscillatory motion to said stand about said pivot, an independent mechanism for imparting oscillatory motion to said shaft about its axis, and another independent mechanism for oscillating said carriage about its vertical axis.

6. In a testing stand for gyroscopic instruments, a carriage, a horizontal shaft supported by said carriage, a testing stand pivotally secured to said shaft and free to swing relatively thereto, a crank connection and mechanism for rocking said stand on said shaft, means for oscillating said shaft about its axis, said crank connection being arranged for lateral motion to permit said shaft to oscillate.

7. In a testing stand for gyroscopic instruments, a carriage mounted for rotation about a vertical axis, a testing stand supported by said carriage and having its vertical axis coincident with that of the carriage, means for imparting oscillatory motion to said stand, and means for turning said carriage about its vertical axis, whereby the testing stand has imparted thereto a compound oscillation about at least two axes.

8. In a testing stand for gyroscopic instruments, a carriage mounted for rotation about a vertical axis, a testing stand supported by said carriage and having its vertical axis coincident with that of the carriage, means for imparting oscillatory motion to said stand in planes at right angles to each other, and means for turning said carriage about its vertical axis, whereby the testing stand has imparted thereto a compound oscillation about at least two axes.

9. In a testing stand for gyroscopic instruments, a carriage mounted for rotation about a vertical axis, a horizontal shaft supported by said carriage, a testing stand with its vertical axis coincident with the vertical axis of said carriage and secured to said shaft, means for imparting oscillatory motion to said shaft, and means for rotating said carriage and stand while the latter oscillates on said shaft.

10. In a testing stand for gyroscopic instruments, a carriage mounted for rotation about a vertical axis, a horizontal shaft supported by said carriage, a testing stand located with its vertical axis substantially coincident with the vertical axis of said carriage and pivotally secured to said shaft, means for oscillating said stand on said pivot, means for imparting oscillatory motion to said shaft, and means for rotating said carriage, whereby the testing stand has imparted thereto compound motion about three axes.

11. In a testing stand for gyroscopic instruments, a carriage mounted for movement about a vertical axis, a horizontal shaft supported by said carriage, a testing stand located with its vertical axis substantially coincident with the vertical axis of said carriage and pivotally secured to said shaft, means for oscillating said stand on said shaft, means for simultaneously imparting oscillatory movement to said shaft, and means for imparting oscillatory movement to said carriage.

12. In a testing stand for gyroscopic instruments, a carriage, a horizontal shaft supported by said carriage and arranged for oscillation about its axis, a vertical shaft pivotally supported by said horizontal shaft and free to swing at right angles thereto, a testing stand secured to said vertical shaft and spaced from said horizontal shaft, a mechanism for operating a crank, a crank connection, a loose collar on said vertical shaft, said crank connections connecting at one end to said crank with a ball and socket joint and connecting at the other end to said loose collar, whereby said vertical shaft is swung on said pivots and said horizontal shaft is free to rotate.

13. In a testing stand for gyroscopic instruments, a carriage mounted for rotation about a vertical axis, a horizontal shaft supported by said carriage, a vertical shaft pivotally supported by said horizontal shaft, said vertical shaft having its axis coincident with the vertical axis of said carriage, a testing stand secured to said vertical shaft and spaced from said horizontal shaft, means for simultaneously imparting oscillatory motion to said vertical shaft on its pivot support, for imparting oscillatory motion to said horizontal shaft and for oscillating said carriage about its axis.

14. A testing device for instruments, comprising a carriage adapted for turning about a vertical axis, means for so turning said carriage, an instrument supporting member mounted on said carriage with its vertical axis substantially coincident with the vertical axis of said carriage, and means for imparting oscillatory motion to said member about a plurality of axes angularly disposed with respect to each other and to the vertical axis of said carriage.

15. A testing device for instruments, comprising a carriage adapted for turning about a vertical axis, means for turning said carriage about said axis, an instrument supporting member mounted on said carriage, and means also mounted on said carriage for imparting oscillatory motion to said member about a plurality of axes angularly disposed with respect to each other and to the vertical axis of said carriage.

16. In a testing device for instruments, a carriage mounted for oscillation about a vertical axis, an element mounted on said carriage for oscillation about a horizontal axis, an instrument supporting member mounted on said element for oscillation with respect thereto about an axis at an angle to said second mentioned axis, but in the same plane therewith and means for oscillating said carriage, said element and said member about their respective axes.

17. A testing stand for gyroscopic instruments comprising an instrument supporting member, means for mounting the same for oscillation about a plurality of axes, and independent means for imparting oscillatory motion to said member about each of said axes.

18. A testing stand for gyroscopic instruments comprising an instrument supporting member, means for mounting the same for oscillation about a plurality of axes, independent means for imparting oscillatory motion to said platform about each of said axes, and controllable means for varying the extent of oscillation about each axis.

19. A testing stand for gyroscopic instruments comprising an instrument supporting member, means for mounting the same for oscillation about a plurality of axes, independent means for imparting oscillatory motion to said platform about each of said axes, and controllable means for varying the period of oscillation about each axis.

20. A testing stand for gyroscopic instruments, comprising an instrument supporting member, means for mounting the same for oscillation about a plurality of axes, independent means for oscillating said platform about each of said axes, controllable means for varying the extent of oscillation about each axis, and controllable means for varying the period of oscillation about each axis.

21. A testing device for instruments, comprising a carriage adapted for turning about a vertical axis, means for so turning said carriage, an instrument supporting member mounted on said carriage with its vertical axis substantially coincident with the vertical axis of said carriage, and means for imparting oscillatory motion to said member about an axis disposed at an angle to said vertical axis.

22. A testing device for instruments, comprising a carriage adapted for turning about a vertical axis, means for so turning said carriage, an instrument supporting member mounted on said carriage with its vertical axis substantially coincident with the vertical axis of said carriage, means for rocking said member about an axis disposed at an angle to said vertical axis, and means for varying the extent of oscillation about said last named axis.

23. A testing device for instruments, comprising a carriage adapted for turning about a vertical axis, means for so turning said carriage, an instrument supporting member mounted on said carriage with its vertical axis substantially coincident with the vertical axis of said carriage, means for imparting oscillatory motion to said member about an axis disposed at an angle to said vertical axis, and means for varying the period of oscillation about each of said axes.

24. In a testing stand for gyroscopic instruments, a carriage mounted for turning about a vertical axis, an instrument supporting member mounted on said carriage, means for simultaneously imparting an independent oscillatory motion to said member in a plurality of planes, means for oscillating said carriage about said vertical axis, and means for varying the period of said oscillations.

25. In combination with a testing stand for navigational instruments, a carriage therefor mounted for rotary movement about a vertical axis, means for turning said stand about two axes permanently at right angles to each other and normally horizontal and means for simultaneously oscillating said carriage about said vertical axis.

26. In a testing device for navigational instruments, a stand, means for simultaneously operating said stand about three axes normally at right angles to each other to simulate the rolling, pitching and yawing of a ship at sea.

27. In a testing device for navigational instruments, a stand, means for simultaneously operating said stand about a vertical axis and about two axes normally in a horizontal plane and permanently at right angles to each other to simulate the rolling, pitching and yawing of a ship at sea.

28. In a testing device for navigational instruments, a stand, means for simultaneously rotating said stand about a vertical axis corresponding to yawing movements of a vessel, oscillating said stand laterally about a substantially horizontal axis corresponding to rolling movements of a vessel, and oscillating said stand longitudinally about a substantially horizontal axis corresponding to pitching movements of a vessel.

29. In a testing device for navigational instruments, a stand mounted for movement about three axes normally at right angles to each other, means for oscillating said stand about two of said axes, means for oscillating said stand about the third axis, means for rotating said stand about said third axis, and means whereby either of said last two means may be rendered effective and the other ineffective.

30. In a testing device for navigational instruments, a stand mounted for movement about a plurality of axes, means for operating said stand about said axes, said means including means for oscillating said stand about one of said axes, means for rotating said stand about said axis, and means whereby either of said last two means may be rendered effective and the other ineffective.

In testimony whereof I have affixed my signature.

ELMER A. SPERRY.